(12) United States Patent
Yang et al.

(10) Patent No.: US 11,151,868 B2
(45) Date of Patent: *Oct. 19, 2021

(54) REMOTE VEHICLE CONTROL AT INTERSECTIONS

(71) Applicant: Toyota Jidosha Kabushiki Kaisha, Nagakute (JP)

(72) Inventors: Hao Yang, Mountain View, CA (US); Kentaro Oguchi, Menlo Park, CA (US)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/786,775

(22) Filed: Feb. 10, 2020

(65) Prior Publication Data
US 2020/0193814 A1 Jun. 18, 2020

Related U.S. Application Data

(63) Continuation of application No. 15/953,360, filed on Apr. 13, 2018, now Pat. No. 10,559,197.

(51) Int. Cl.
*G08G 1/01* (2006.01)
*G05D 1/00* (2006.01)
(Continued)

(52) U.S. Cl.
CPC ......... *G08G 1/0145* (2013.01); *G05D 1/0027* (2013.01); *G05D 1/0287* (2013.01); *G08G 1/0133* (2013.01); *G05D 2201/0213* (2013.01)

(58) Field of Classification Search
CPC .............. G08G 1/0145; G08G 1/0133; G08G 1/096708; G08G 1/164; G08G 1/166;
(Continued)

(56) References Cited

U.S. PATENT DOCUMENTS 9,142,127 B1 * 9/2015 McDevitt-Pimbley ...................... G08G 1/096708
9,759,812 B2 * 9/2017 Nichols .................. G08G 1/164
(Continued)

FOREIGN PATENT DOCUMENTS

CN 106875710 A 6/2017
JP 2006350719 A 12/2006
(Continued)

OTHER PUBLICATIONS

Guler, et al., "Using Connected Vehicle Technology to Improve the Efficiency of Intersections," Traffic Engineering Group, Institute for Transport Planning Systems (2014) (11 pages).
(Continued)

*Primary Examiner* — Frederick M Brushaber
(74) *Attorney, Agent, or Firm* — VLP Law Group LLP; Michel Bohn

(57) ABSTRACT

In an example, a method determines one or more characteristics of an intersection of two or more lanes of a roadway and determines a plurality of compatible movement groups representing allowable movement options of vehicles approaching the intersection. The method further calculates delays for the compatible movement groups, respectively, selects a compatible movement group from the plurality of compatible movement groups based on the delays, and provides control instructions to a set of the vehicles in a control region of the intersection associated with the compatible movement group to control one or more dynamics of each of the vehicles of the set as the vehicles of the set traverse the intersection.

20 Claims, 8 Drawing Sheets

(51) Int. Cl.
*G05D 1/02* (2020.01)
*G08G 1/16* (2006.01)
*H04L 29/08* (2006.01)

(58) Field of Classification Search
CPC ............ G08G 1/096791; G08G 1/161; G05D 1/0027; G05D 1/0287; G05D 2201/0213; H04L 67/10; H04L 67/125
See application file for complete search history.

(56) References Cited

U.S. PATENT DOCUMENTS

| | | | |
|---|---|---|---|
| 9,818,299 | B1 | 11/2017 | Jammoussi et al. |
| 9,940,832 | B2* | 4/2018 | Bansal .................... G08G 1/08 |
| 10,037,693 | B2* | 7/2018 | Ryu ........................ G08G 1/08 |
| 10,147,316 | B2* | 12/2018 | Radomy ................. G08G 1/07 |
| 10,332,403 | B2* | 6/2019 | Saigusa ............... G05D 1/0223 |
| 10,559,197 | B2 | 2/2020 | Yang et al. |
| 2009/0118875 | A1* | 5/2009 | Stroud ................... G05D 1/104 701/3 |
| 2011/0156924 | A1* | 6/2011 | Nadeem ............... G08G 1/0104 340/905 |
| 2013/0018572 | A1 | 1/2013 | Jang |
| 2014/0278052 | A1* | 9/2014 | Slavin .................. G08G 1/0129 701/400 |
| 2016/0027299 | A1* | 1/2016 | Raamot .................... G08G 1/08 340/917 |
| 2016/0027300 | A1* | 1/2016 | Raamot ............... G08G 1/0116 340/922 |

FOREIGN PATENT DOCUMENTS

| | | | |
|---|---|---|---|
| JP | 2007141145 A | 6/2007 |
| JP | 2011028625 A | 2/2011 |
| JP | 2015076046 A | 4/2015 |

OTHER PUBLICATIONS

Liu et al., "Real-time Queue Length Estimation for Congested Signalized Intersections," Department of Civil Engineering, University of Minnesota, 2009 (16 pages).

Liu, et al., "A Lane Level Positioning-based Cooperative Vehicle Conflict Resolution Algorithm for Unsignalized Intersection Collisions," School of Transportation Science and Engineering, Beihang University and School ofElectronic and Information Engineering, Beijing Jiaotong University, 2013 (18 pages).

Malikopoulos, et al., "A Decentralized Energy-Optimal Control Framework for Connected Automated Vehicles at Signal-Free Intersections," Department of Mechanical Engineering, University of Delaware and Division of SystemsEngineering and Center for Information and Systems Engineering, Boston University, 2017 (16 pages).

Mirheli, et al., "Development of a Signal-Free Intersection Control Logic in a Fully Connected and Autonomous Vehicle Environment," Department of Civil Engineering, Stony Brook University and Department of Civil andEnvironmental Engineering, Washington State University, 2018 (1 page).

Sun, et al., "A Capacity Maximization Scheme for Intersection Management with Automated Vehicles," Department of Civil and Environmental Engineering, University of Michigan Transportation Research Institute, 2017 (16 pages).

Unknown, "Traffic Flow Theory for 1-D," Chapter 2, Springer, www.springer.com/978-3-54075559-3, 2008 (29 pages).

Office Action of Application No. JP 2019-065698, dated Apr. 4, 2020 (3 pages).

* cited by examiner

REMOTE VEHICLE CONTROL AT INTERSECTIONS

BACKGROUND

Conflicting movements between vehicles at intersections cause significant problems in modern day urban driving, including accidents and traffic bottlenecks. To manage traffic at an intersection, traffic signals are commonly installed and used. While traffic signals can improve safety can capacity over static solutions such as stop signs, they suffer from significant limitations.

For example, traffic signals are purposefully designed to interrupt traffic streams, to allow competing traffic streams to traverse an intersection. This increases road congestion and fuel usage, particularly during high traffic volume parts of the day, such as rush hour.

Additionally, traffic signals can be very expensive for governments, tax payers, or stakeholders, to install and maintain.

While recently various autonomous intersection management systems (AIMS) have become available that can control connected and/or autonomous vehicles at intersections without the use of traffic signals, these AIMS have significant drawbacks that necessitate a better alternative. For example, US Pre-grant Publication 2013/0018572 (US'572) discloses an apparatus and method for controlling vehicle at autonomous intersection. The method controls traffic at an intersection without the help of traffic signals to control traffic streams. However, under US'572's method, all vehicles must be connected and automated. Additionally, the centralized controller must have full knowledge about and control of all the vehicles at intersection in order to control vehicle traffic at the intersection, which is impractical given the number of different makes and models of vehicles, the mix of autonomous, connected, and unconnected vehicles that exist on roadways.

In another example, U.S. Pat. No. 9,818,299 (U.S. '299) discloses an autonomous intersection navigation control system that provides vehicle-to-vehicle intersection navigation control based on vehicle-to-vehicle communications. In the system, one host vehicle collects intersection arrival data of other vehicles and assigns priority to each of them, so as to assist them pass the intersection safely without the help of traffic signals. However, this system still requires all vehicles at the intersection to be connected and equipped with wireless communication devices, and all vehicles are required to exactly follow the instructions of the system, which is impractical as noted above. In addition, US'299 merely proposes the framework for autonomous intersection management with connected vehicles and does not describe how performance at intersections, such as mitigating congestion or reducing fuel usage, could be achieved.

Various other studies describe signal-free intersection control systems that purportedly optimize traffic performance at intersections with connected and autonomous vehicles using different optimization algorithms. However, like the above solutions, these studies require all involved vehicles to be connected and autonomous vehicles so that all vehicles in the vicinity of the intersection can share information with others vehicles and/or vehicle infrastructure. As such, the systems must have authorization to fully control the behaviors of all vehicles at the intersection. This requirement is too strict in a world where vehicles at an intersection have varying capacities (e.g., ranging from none to fully autonomous) for onboard self-control, vehicle-to-vehicle communication, vehicle-to-infrastructure communication, etc.

Various other intersection management solutions using connected and autonomous vehicles require a certain percentage of connected and autonomous vehicles to exist so that the solutions can estimate traffic conditions of intersections, and search for the optimal signal phasing and timing plans to improve the performance of the intersection. However, these solutions require traffic signals to exist at the intersections, and the connected and autonomous vehicles must be able to communicate with the signalization systems that control the traffic signals, and thus are inapplicable to embodiments in which traffic signals are not used.

SUMMARY

The innovative, non-obvious technology described herein can remotely control connected vehicles to optimize intersection performance without assistance of traffic signals. The technology is capable of handling a mixture of connected vehicles and unconnected vehicle in the driving environment. It can advantageously apply an intersection delay prediction model, which utilizes connected vehicle dynamic information to predict the delay of all vehicles at a given intersection. In some example cases, the system can minimize the overall delay at the intersection by only controlling connected vehicles' dynamics (e.g., speeds, etc.) at the intersection, which may be non-signalized.

According to one innovative aspect, a method determines one or more characteristics of an intersection of two or more lanes of a roadway and determines a plurality of compatible movement groups representing allowable movement options of vehicles approaching the intersection. The method further calculates delays for the compatible movement groups, respectively, selects a compatible movement group from the plurality of compatible movement groups based on the delays, and provides control instructions to a set of the vehicles in a control region of the intersection associated with the compatible movement group to control one or more dynamics of each of the vehicles of the set as the vehicles of the set traverse the intersection.

According to another innovative aspect, a system comprises one or more processors one or more non-transitory memories storing instructions that, when executed by the one or more processors, cause the system to perform operations comprising: determining one or more characteristics of an intersection of two or more lanes of a roadway, determining a plurality of compatible movement groups representing allowable movement options of vehicles approaching the intersection; calculating delays for the compatible movement groups, respectively, selecting a compatible movement group from the plurality of compatible movement groups based on the delays, and providing control instructions to a set of the vehicles in a control region of the intersection associated with the compatible movement group to control one or more dynamics of each of the vehicles of the set as the vehicles of the set traverse the intersection.

In general, by way of example, these or other aspects may optionally include one or more of the following features: predicting vehicle movements of the vehicles associated with each movement option of the allowable movements options; that generating the control instructions is further based on the predicted vehicle movements; predicting a vehicle delay for one or more vehicles associated with each movement option of the allowable movement options; that each of the delays is calculated based on the vehicle delay of the one or more vehicles that of the allowable movement options of that compatible movement group; monitoring connected vehicles (CVs) included in the vehicles in the control region of the intersection; that the predicted vehicle movements are determined based on the monitoring; that monitoring the CVs comprises receiving dynamic vehicle data for a time t; calculating one or more vehicle dynamics of one or more unconnected vehicles (unCV) from the vehicles at the time t; that calculating the delay values for the compatible movement groups comprises estimating connected vehicles and unconnected vehicle releasing departure times, and calculating a releasing delay for the vehicles associated with a movement option of each compatible movement group; that calculating the delay values for the compatible movement groups comprises estimating connected vehicles and unconnected vehicle stopping departure times; and calculating a stopping delay for the vehicles associated with a movement option of each compatible movement group.

The technology described herein provides several benefits over the approaches described in the Background, which include, but are not limited to, improving the performance of intersections without the help of roadside infrastructures, including traffic signals, stop signs, roundabouts, etc., can manage a vehicle mix at an intersection that includes both connected and unconnected vehicles (as compared with existing signal-free intersection control systems that cannot), can control traffic more efficiently and less expensively than existing intersection management systems, and can easily be configured to meet various objectives, such as minimizing vehicle delays, reducing fuel usages, decreasing risks of incidents, etc.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The invention develops a centralized vehicle control system to realize autonomous intersection management without traffic signals and to minimize vehicle delays at intersections and mitigate road congestions. The system is implemented at either vehicular micro-clouds clustered with connected vehicles or edge servers at intersections, and two-way communications are established between the system and all connected vehicles.

Different from existing signal-free intersection control, the proposed system can work for intersection at partially connected environment and improve the performance of intersection by only controlling a certain percentage of vehicles on roads.

Figure 1:
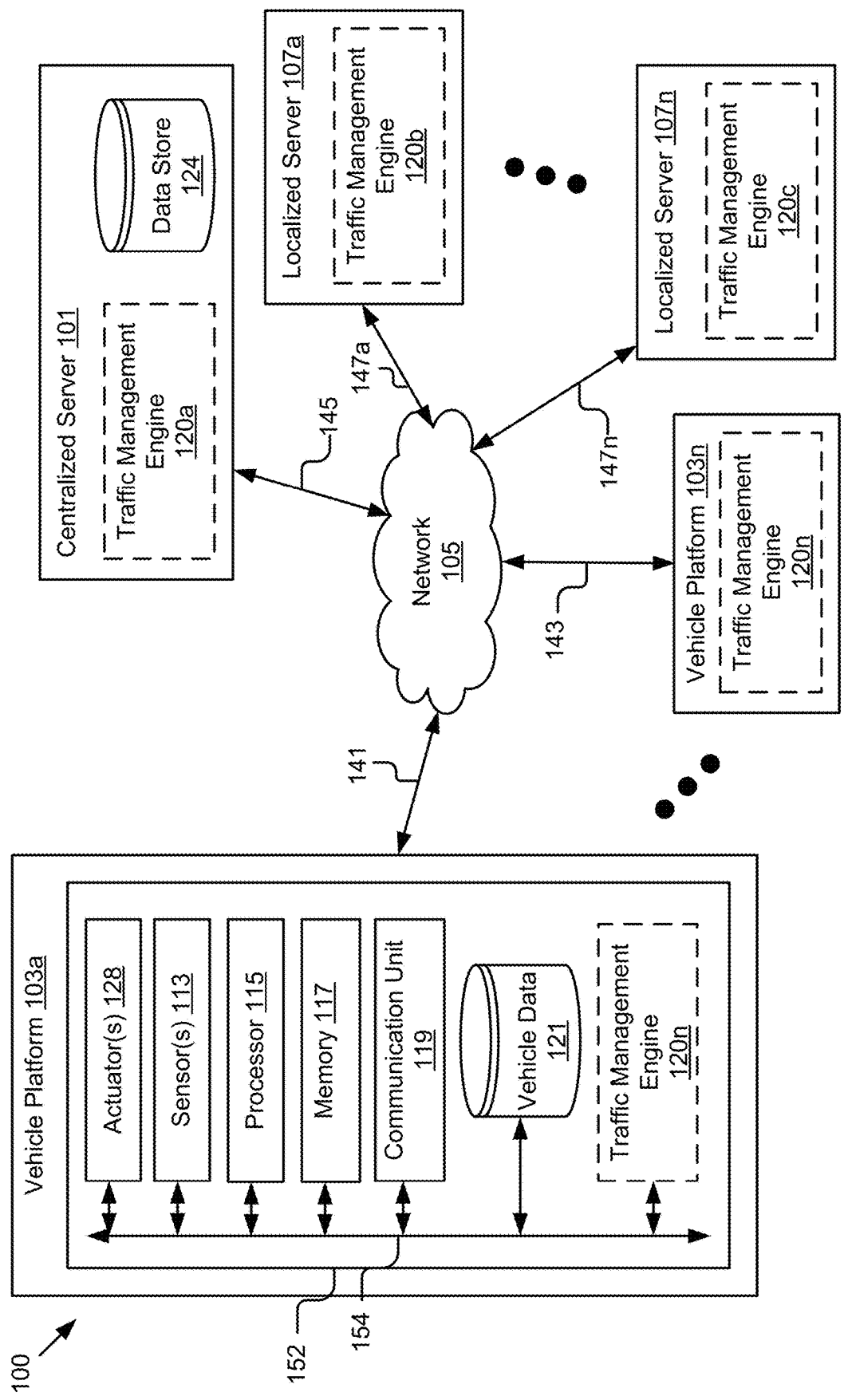
FIG. 1 is a block diagram of an example system for managing vehicle traffic.

FIG. 1 is a block diagram of an example system 100 for managing vehicle traffic. As shown, the system 100 includes a centralized server 101, one or more vehicle platforms 103a . . . 103n, and one or more localized servers 107 coupled for electronic communication via a network 105. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103, networks 107, or servers 101 and/or 107.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 may be a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, vehicle-to-infrastructure/vehicle-to-everything (V2I/V2X) networks, or any other wireless networks. In some embodiments, the network 105 may be a vehicular wireless networks having limited resources, e.g., limited communication bandwidth that may cause considerable transmission latency, etc. Although FIG. 1 illustrates a single block for the network 105 that couples to the server 101, the vehicle platform(s) 103, and the third-party server(s) 105, it should be understood that the network 105 may in practice comprise any number of combination of networks, as noted above.

The vehicle platform(s) 103 include computing device(s) 152 having sensor(s) 113, processor(s) 115, memory(ies) 117, communication unit(s) 119, a vehicle data store 121, a traffic management engine 120, a tracking application 122, and a map application 124. Examples of computing device(s) 152 may include virtual or physical computer processors, control units, micro-controllers, etc., which are coupled to other components of the vehicle platform(s) 103, such as one or more sensors 113, actuators 128 (e.g., actuators, motivators, etc.), etc. The vehicle platform(s) 103 may be coupled to the network 105 via signal line 141, and may send and receive data to and from other vehicle platform(s) 103, the third-party server(s) 105, and/or the server(s) 101. In some embodiments, the vehicle platform(s) 103 are capable of transporting from one point to another. Non-limiting examples of the vehicle platform(s) 103 include a vehicle, an automobile, an agricultural machine, a motorcycle, a bicycle, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s).

The vehicle platform(s) 103 are capable of transporting from one point to another. The vehicle platform(s) 103 may be referred to herein as vehicle(s). As it travels down the roadway, a vehicle platform 103 may hop between localized servers 107 associated with different sequential segments of a roadway. For example, a vehicle platform 103*n* may wireless connect (e.g., through the network 105, via a dedicated localized server access point, etc.) to and communicate with localized server 107*a* when driving along a first roadway segment and then connect to and communicate with a second localized server 107*n* when driving along a subsequent roadway segment. In some cases, a vehicle 103 may use a V2I connection that provide the vehicle 103 access to any applicable data and allow the vehicle 103 to transmit data for any suitable purpose, although in other embodiments, the connection may comprise a cellular data, Wi-Fi™, satellite data, and/or other type of wireless network connection. These connections also allow vehicles to become connected, such that they can send and receive information instantaneously while moving (e.g., access any suitable Internet-based services, etc.).

In some embodiments, each vehicle platform 103 may send data to and receive data from other vehicle platform(s) 103, other localized servers 107, and/or the server(s) 101 via the network 105 through the localized server 107 to which the vehicle platform 103 is currently connected at a particular point in time, or via other network data connection(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the vehicle platform 103, the processor may be an electronic control unit (ECU) implemented in the vehicle platform 103 such as a car, although other types of platform are also possible and contemplated. In some embodiments, the ECUs may receive and store the sensor data as vehicle operation data in the vehicle data store 121 for access and/or retrieval by the traffic management engine 120. For instance, the ECUs may implement models, machine learning logic(s) (e.g., software, code, etc.), that are trained to generate compact representations of detected objects, or to identify locations of the detected objects. For another instance, the ECUs may implement dynamic road map generation and updates. In some implementations, the processor(s) 115 may be capable of generating and providing electronic display signals to input/output device(s), supporting the display of images, capturing and transmitting images, performing complex tasks including various types of object recognition and feature extraction, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, and/or and the vehicle data store 121.

The traffic management engine 120 is software and/or hardware logic executable to manage traffic comprising connected and unconnected vehicle platforms 103. As illustrated in FIG. 1, the servers 101 and 107, and the vehicle platforms 103*a* . . . 103*n* may include instances 120*a*, 120*b*, 120*c*, 120*d*, . . . 120*n* of the traffic management engine 120. In some embodiments, each instance 120*a* . . . 120*n* may comprise one or more components of the traffic management engine 120 depicted in FIG. 2, and may be configured to fully or partially perform the functionalities described herein depending on where the instance resides.

In some embodiments, the traffic management engine 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The traffic management engine 120 may receive and process the sensor data and/or the vehicle data, and communicate with other elements of the vehicle platform 103 via the bus 154, such as the processor(s) 115, the memory(ies) 117, the communication unit 119, the vehicle data store 121, etc., other controllers, etc. The traffic management engine 120 is described in details below with reference to at least FIGS. 2-5.

The memory(ies) 117 include a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store in instance of the traffic management engine 120 and/or data used and/or produced thereby. In some implementations, the memory(ies) 117 may include one or more of volatile memory and non-volatile memory. For example, the memory(ies) 117 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 117 may be a single device or may include multiple types of devices and configurations.

The communication unit(s) 119 transmit data to and receive data from other computing devices to which it is communicatively coupled (e.g., via the network 105) using wireless and/or wired connections. A communication unit 119 may include one or more wired interfaces and/or wireless transceivers for sending and receiving data. A communication unit 119 may couple to the network 105 and communicate with other computing nodes, such as other vehicle platform(s) 103, server(s) 101, and/or third-party server(s) 105, etc. A communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geo-location sensors, orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, left side, bottom, and/or top of the vehicle platform 103 in order to capture the situational context surrounding the vehicle platform 103.

In some embodiments, the sensor(s) 113 may include one or more image sensors (e.g., optical sensors) configured to record images including video images and still images, may record frames of a video stream using any applicable frame rate, and may encode and/or process the video and still images captured using any applicable methods. In some embodiments, the image sensor(s) 113 can capture depth and/or stereo images of surrounding environments within their sensor range. For example, in the context of a vehicle platform, the image sensors 113 can capture the environment around the vehicle platform 103 including roads, buildings, roadside structures, infrastructures (e.g., roadside signs, accidents, roadside constructions, traffic lights, etc.), static road objects, and/or dynamic road objects (e.g., vehicle platforms 103, pedestrians, bicycles, animals, etc.), etc. In some embodiments, the image sensors 113 may be mounted on the vehicle roof and/or inside the vehicle platform 103 to sense in any direction (forward, rearward, sideward, upward, downward facing, etc.) relative to the moving direction of the vehicle platform 103. In some embodiments, the image sensors 113 may be multidirectional (e.g., LIDAR). In some embodiments, the image sensors 113 installed on different vehicle platforms 103 may have different viewpoints and/or view angles and may be configured with different settings, installations, and/or configurations.

The actuator(s) 128 include mechanical and/or electrical devices that are capable of producing or inhibiting motion. The actuator(s) 128 may be electric, pneumatic, hydraulic, magnetic, mechanical, thermodynamic, and/or magnetic, and/or a combination of the foregoing. Non-limiting example actuator(s) 128 include electric motors, motorized linkages, signaling components, servomechanisms, hydraulic cylinders, pneumatic actuators, corresponding gearing, connectors, and kinematic components, combustion engines, jet engines, etc. The actuators are be coupled to components via linkages, transmissions, drivelines, hydraulics, and/or other assemblies, such as those including wheels, props, turbo fans, blowers, jets, and/or other components, that are capable of accelerating, decelerating, and steering the vehicle 103.

The vehicle data store 121 includes a non-transitory storage medium that stores various types of data. For example, the vehicle data store 121 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., transmission, speed, acceleration, deceleration, wheel speed (Revolutions Per Minute—RPM), steering angle, braking force, etc. In some embodiments, the vehicle data may include moving direction, vehicle geolocation (e.g., GPS (Global Positioning System) coordinates) indicating geographic location of the vehicle platform 103, safety device states (e.g., airbag, impact/crash state, etc.), etc. In some embodiments, the vehicle data may include a vehicle identifier (ID) uniquely identifying the vehicle platform 103 (e.g., Vehicle Identification Number (VIN)). In some embodiments, the vehicle data may include any data and information received by a transceiver (e.g. from other roadside units, other vehicles, any third-party server(s) 105, etc.), and/or produced and stored by the traffic management engine 120.

In some embodiments, the vehicle data may also include internal and external scene images captured by one or more image sensors 113 of the vehicle platform 103 and the image data associated with these images. In some embodiments, the image data may include an image timestamp indicating date and time when the image is captured, the sensor position, and the sensor orientation, settings of the image sensor 113, and/or other camera, camera position, vehicle platform sensor, CAN, etc., data when capturing the image. In some embodiments, the image data may also describe one or more objects detected in the image. For example, the image data may include modality feature(s), initial representation(s), and/or compact representation(s) of each detected objects in the image.

The servers 101 and 107 include one or more hardware and/or virtual servers that include a processor, a memory, and network communication capabilities (e.g., a communication unit). In some embodiments, the server 101 may have larger computing capabilities and computing resources than other entities of the system 100 (e.g., the vehicle platforms 103) in some cases. A server 101 or 107 may be communicatively coupled to the network 107, as reflected by signal lines 145 or 147a or 147n. In some embodiments, a server 101 or 107 may send and receive data to and from other entities of the system 100, e.g., one or more vehicle platforms 103, one or more servers 101 and/or 107. As depicted, the servers 101 and 107 may each include an instance of the traffic management engine 120.

The server 101 may also include a data store 124 that stores various types of data for access and/or retrieval by these applications. In some embodiments, the edge servers 107 may also include instance of the data store 124 or a variant thereof.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
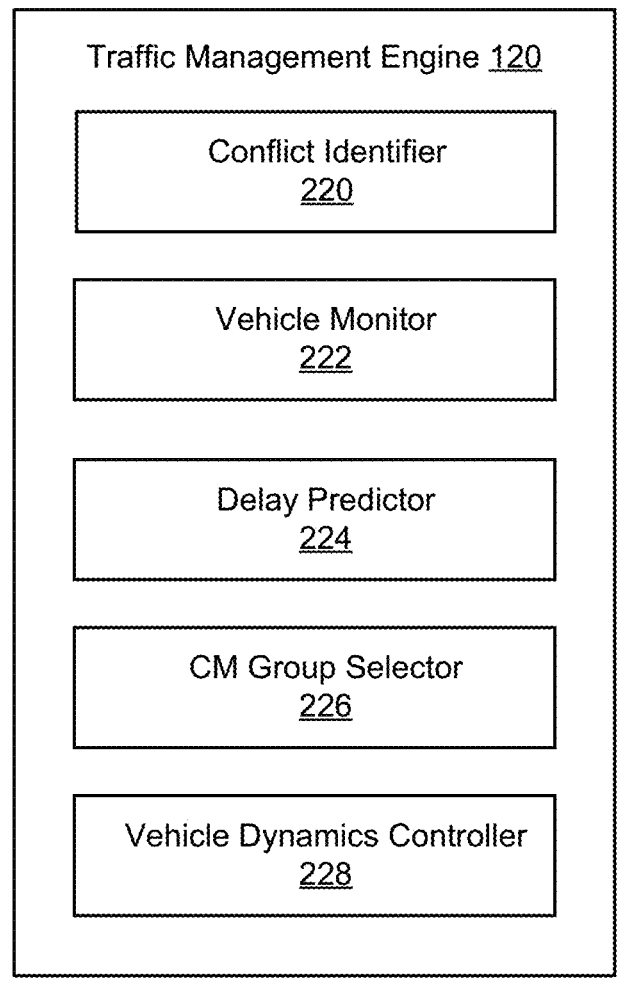
FIG. 2 is a block diagram of an example computing system.

FIG. 2 is a block diagram of an example instance of a traffic management engine 120. The computing device in FIG. 1 may resemble the architecture of a server 101 or 107, absent the actuators 128, various sensors 113, etc., depending on the use case. For example, a server 101 or 107, may comprise a processor, a memory, a communication unit, one or more input or output devices (e.g., a display, buttons, keyboards, pointing devices, etc.), etc., and/or any other known or suitable components, coupled via a communication bus, etc., as one would understand.

As depicted, the traffic management engine 120 may include a conflict identifier 220, a vehicle monitor 222, a delay predictor 224, a compatible movement group selector 226, and/or a vehicle dynamics controller 228. It should be understood that the traffic management engine 120 may include additional components such as, but not limited to, a machine learning engine, an engine control unit, a navigation application, an encryption/decryption engine, etc., and/or these various components may be combined into a single component or divided into additional components.

The traffic management engine 120 and/or one or more of its components may be implemented as software, hardware, or a combination of the foregoing. In some embodiments, the traffic management engine 120, the conflict identifier 220, the vehicle monitor 222, the delay predictor 224, the compatible movement group selector 226, and/or the vehicle dynamics controller 228 may be communicatively coupled by the bus 154 and/or the processor 115 to one another and/or the other components of the computing device 152. In some embodiments, one or more of the traffic management engine 120, the conflict identifier 220, the vehicle monitor 222, the delay predictor 224, the compatible movement group selector 226, and/or the vehicle dynamics controller 228 are sets of instructions executable by the processor 115 to provide their functionality. In further embodiments, one or more of the traffic management engine 120, the conflict identifier 220, the vehicle monitor 222, the delay predictor 224, the compatible movement group selector 226, and/or the vehicle dynamics controller 228 are storable in the memory 117 and are accessible and executable by the processor 115 to provide their functionality. In any of the foregoing embodiments, the traffic management engine 120, the conflict identifier 220, the vehicle monitor 222, the delay predictor 224, the compatible movement group selector 226, and/or the vehicle dynamics controller 228 may be adapted for cooperation and communication with the processor 115 and other components of the computing device 152. The traffic management engine 120 and its components (the conflict identifier 220, the vehicle monitor 222, the delay predictor 224, the compatible movement group selector 226, and/or the vehicle dynamics controller 228) are described in further detail below.

Figure 3:
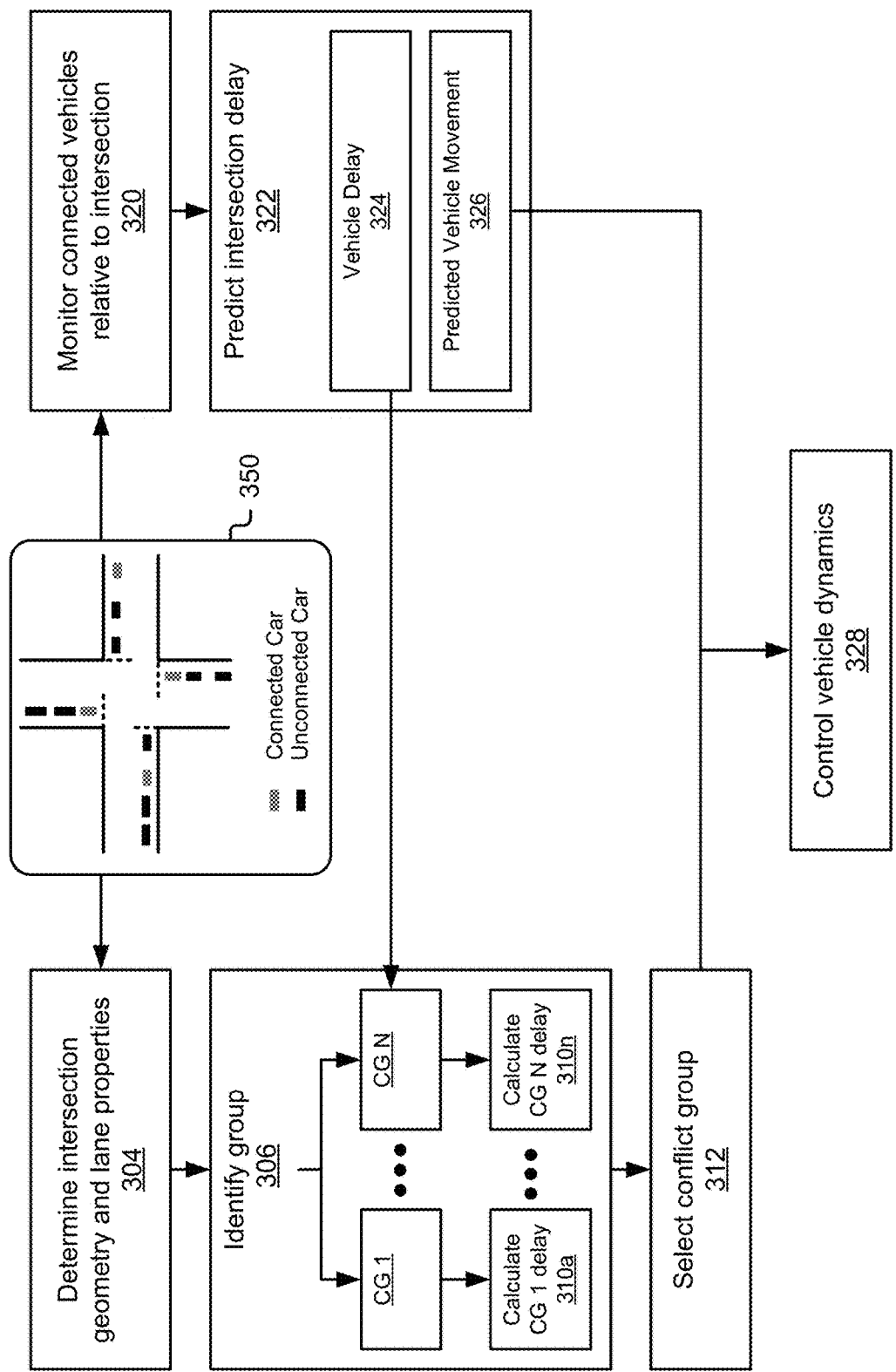
FIG. 3 is a flowchart of an example method for remotely controlling vehicle dynamics for an example intersection.

FIG. 3 is a flowchart of an example method 300 for remotely controlling vehicle dynamics for an example intersection 350. A set of compatible movement groups may be defined for the intersection 350 and stored in the data store 124 and/or another non-transitory memory. Each compatible movement group of the set may be defined based on various intersection geometry and lane properties of the intersection.

FIG. 4 depicts a further graphical representation of the intersection 350. An intersection 350 may comprise an area where two or more lanes 352 cross or converge. For example, the intersection 360 comprises four intersecting lanes 352a, 352b, 352c, and 352d. The traffic in each lane flows in a particular direction. By way of illustration, each lane (352a, 352b, 352c, and 352d) includes a mix of vehicle types. In particular, each lane (352a, 352b, 352c, and 352d) includes one or more connected vehicles and one or more unconnected vehicles.

The traffic management engine 120 may be configured to receive dynamic data from vehicles platforms 103 located in or proximate to a control region 356 of the intersection 350. The control region 356 comprises the area encompassing the upstream, intersecting, and downstream portions of the lanes 352 associated with the intersection 350. The particular region of the intersection 350 where the lanes 352 intersect is referred to as the conflict zone. As shown in FIG. 4, each lane includes an approach region proximate (e.g., abuttingly adjacent) to the conflict zone where vehicle traffic in that lane may yield to cross traffic, come to a stop, continue from, etc.

When proceeding into the intersection, each vehicle platform 103 may have one or more movement options that conflict with the movement options of cross or oncoming vehicles at the intersection 350. Described another way, a vehicle entering the conflict zone may follow a path that potentially conflicts with one or more paths of one or more other lanes. By way of example, the intersection 350 has 8 vehicle movement options (also called paths or path options) $\{p_1, p_2, p_3, p_4, p_5, p_6, p_7, p_8\}$.

In block 304, the conflict identifier 220 may determine one or more intersection characteristics, such as the intersection geometry and lane properties of the intersection 350. For example, the conflict identifier 220 may identify the number of lanes (total, in each direction, etc.), the width of the lanes, the flow of the lanes, any time or travel restrictions on the lanes, etc., the manner in which the lanes meet at the intersection, whether any lanes merge before or after meeting, etc., and may use this information to calculate the movement options for each lane (e.g., go straight, turn left or right, merge with adjacent lane, etc.).

The lane geometry and properties of a given intersection may be predetermined and stored in a lane profile in the data store 124, may be processed from graphical map data stored in the data store 124, may be processed from images captured by vehicle sensors of vehicles that have passed through or are passing through the intersection, or any other suitable variations.

In some embodiments, the traffic management engine 120 may process graphical map data collected from satellite imagery of the intersection, street-level imagery captured by infrastructure or vehicle cameras located in or passing through the intersection, etc. The traffic management engine 120 can process the images using feature detection techniques to identify the lanes and may estimate the lane properties, such as the number of lanes flowing in each direction, the lane widths, the lane types (turning, straight, both, etc.), etc., using visual characteristics from the images, such as detecting traffic flow from frame to frame, estimating lane widths based on known vehicle width averages, etc.

In block 306, the conflict identifier 220 may determine the compatible movement groups CG 1 . . . CG N associated with the intersection 350. In some embodiments, using the movement options, the conflict identifier 220 can identify the compatible movement groups that represent movement options between the various possible movement options that are compatible. For example, using the movement options for the intersection 350, the conflict identifier 220 may identify a set of four compatible movement groups $\{g_1(p_1, p_5), g_2(g_2, p_6), g_3(p_3, p_7), g_4(p_4, p_8)\}$ using the movement options $\{p_1, p_2, p_3, p_4, p_5, p_6, p_7, p_8\}$ depicted in FIG. 4. In this example, $g_1$ includes two compatible options, $p_5$ and $p_1$, where $p_5$ is a left-handed turn for the Westbound vehicles in the approach region of lane 352c, and $p_1$, which is a right-handed turn for the Eastbound traffic in the approach region of lane 352a. These options are compatible because both movements may be reliably performed without substantial interference between the respective vehicles (e.g., without significantly impacting throughput, increasing the risk of collision, movement complexity, time to perform the movement, etc.)

Figure 4A:
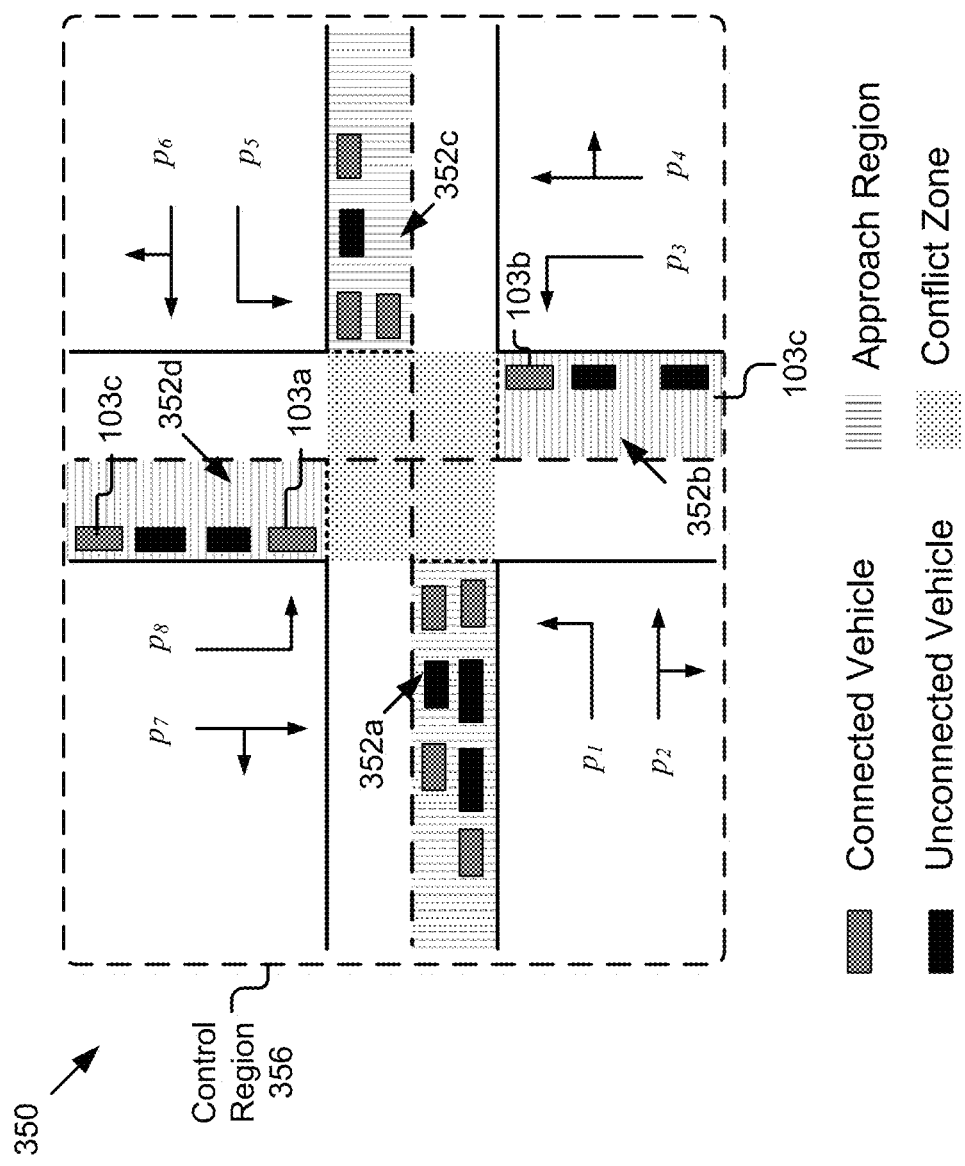
FIG. 4A depicts a further graphical representation of the intersection.
Figure 4B:
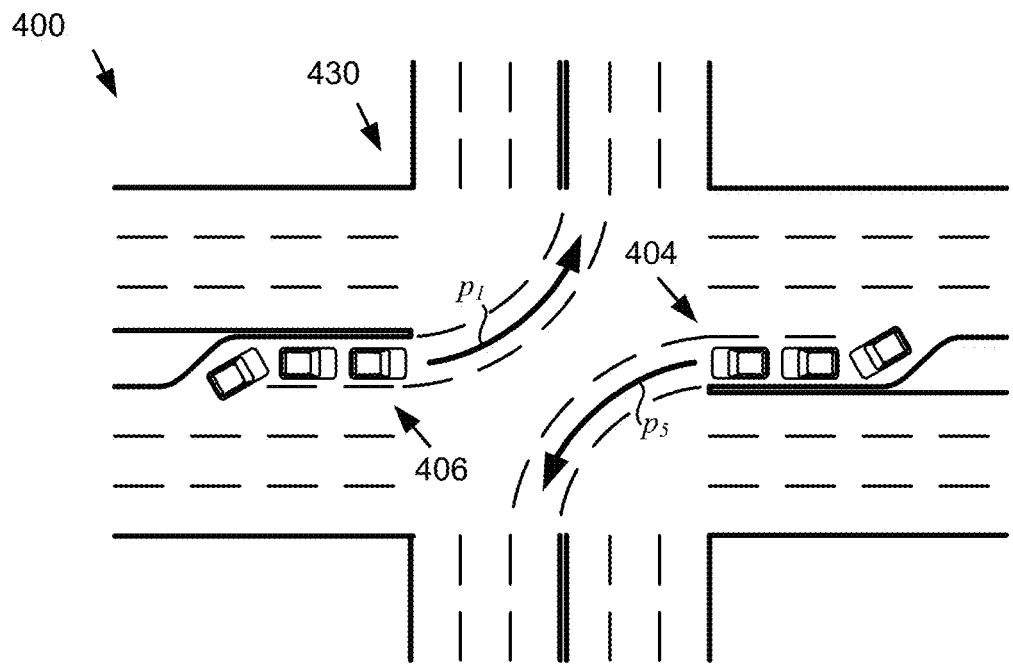
FIGS. 4B-4D depict example variations of compatible and conflicting movement options.
Figure 4B:
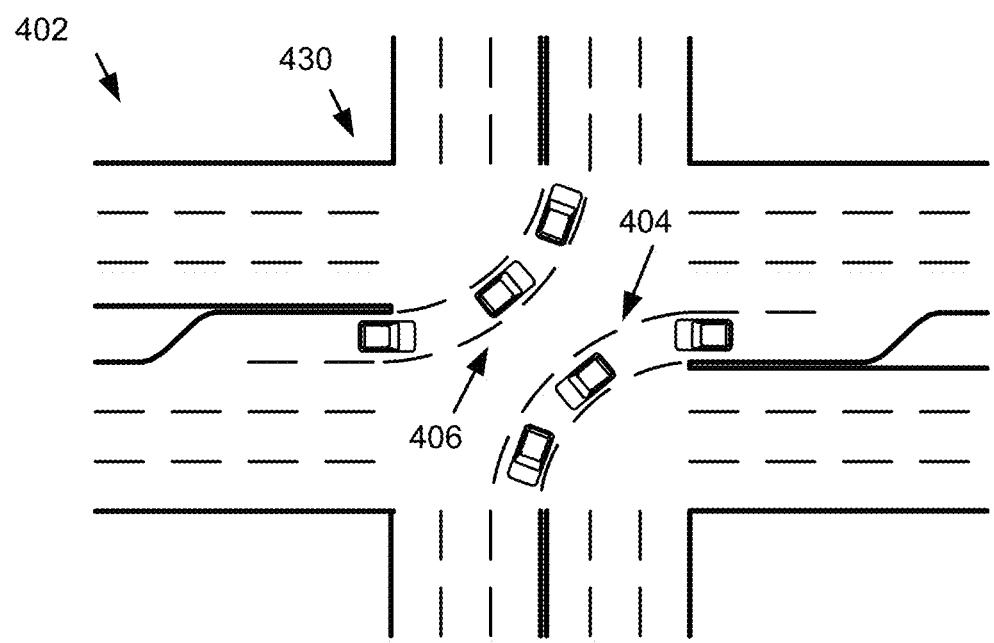
Figure 4C:
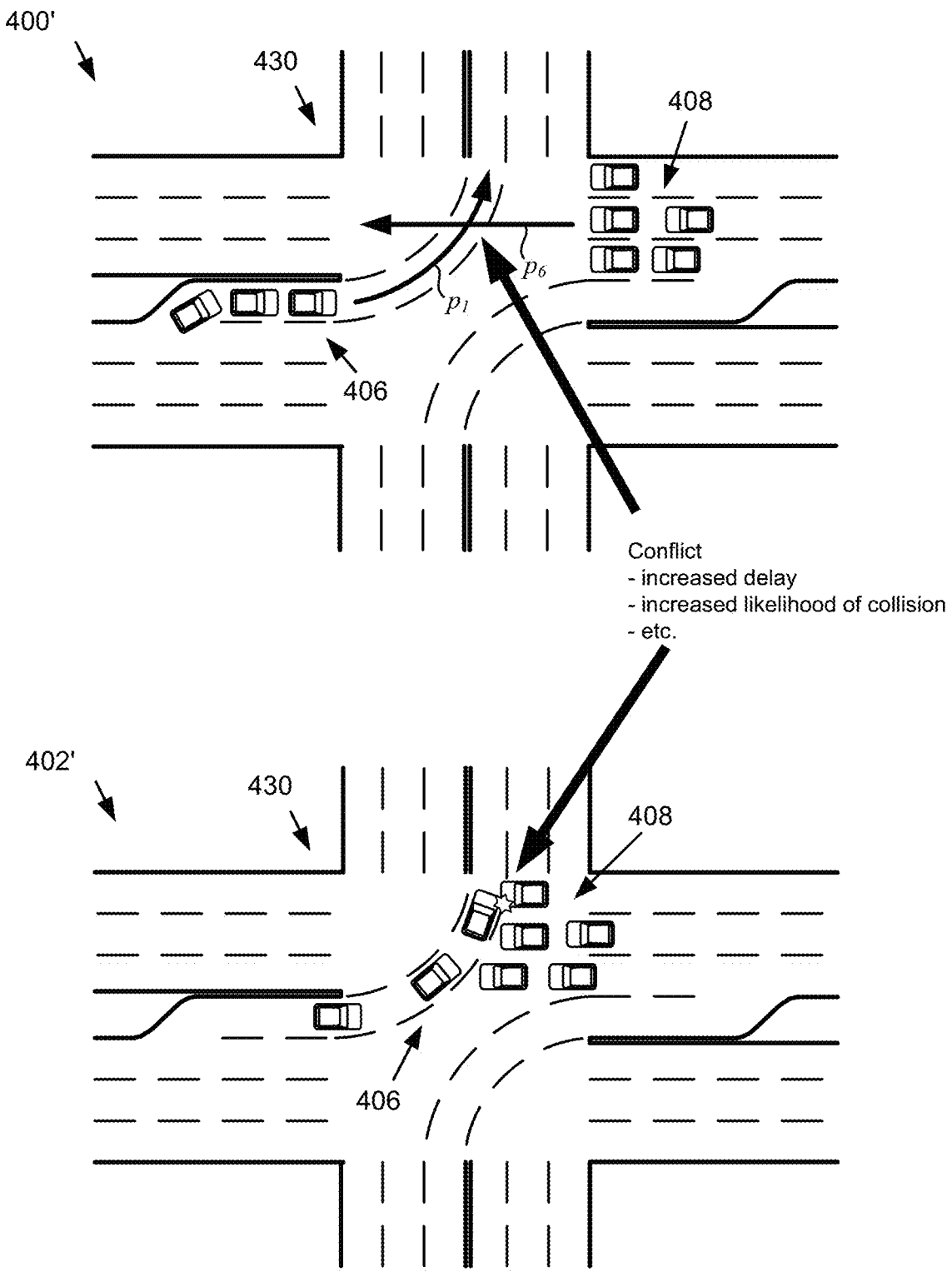
Figure 4D:
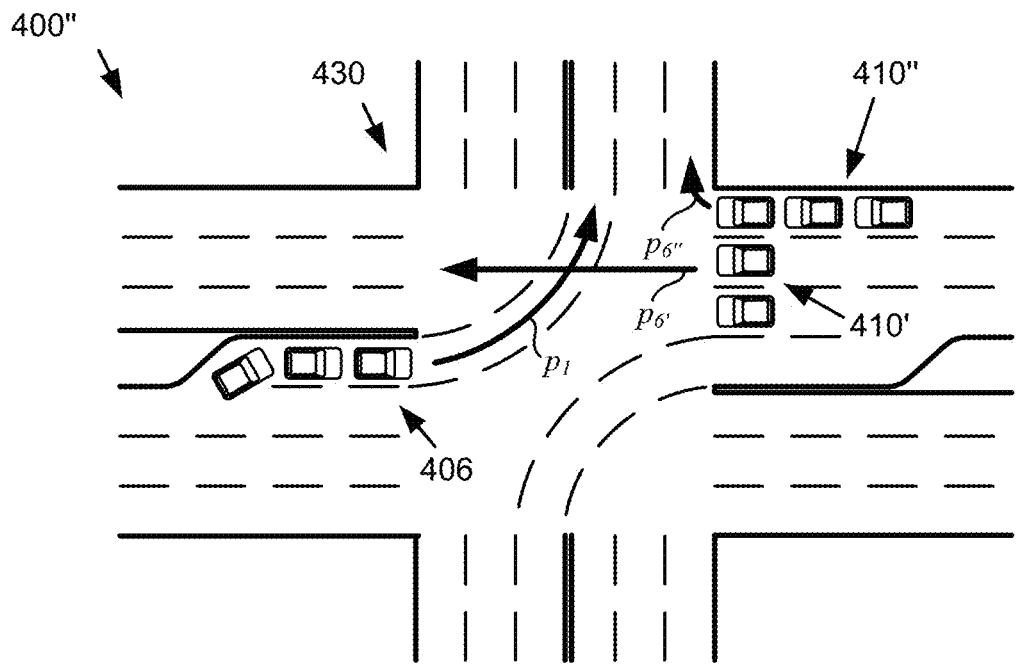
Figure 4D:
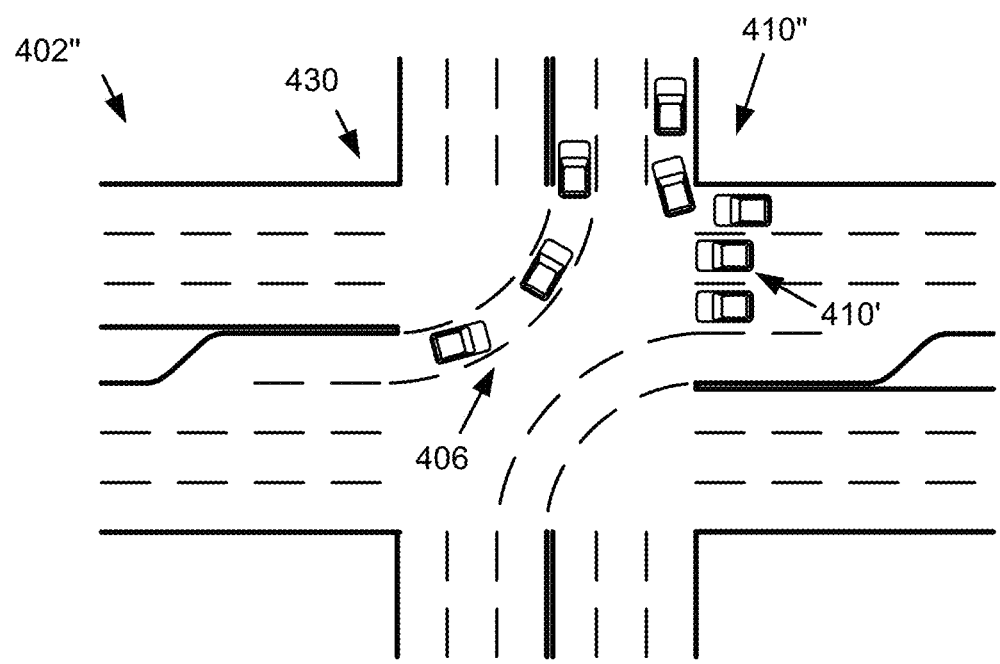

FIGS. 4B-4D depict further example variations of compatible and conflicting movement options.

In a first phase 400 of FIG. 4B, first set of vehicles 404 and a second set of vehicles 406 are respectively queued up at an intersection 400. The first set of vehicles 404 are waiting to make a left turn as reflected by movement option $p_5$. Similarly, the second set of vehicles 406 are also waiting to make a left turn as reflected by movement option $p_1$. Because $p_5$ and $p_1$ are determined to be compatible by conflict identifier 220, and grouped into a corresponding compatible movement group G1, the traffic management engine 120 may determine that a particular point in time to instruct the vehicles of the first second set 404 and 406, respectively, to proceed through the intersection in accordance with the respective movement options $p_5$ and $p_1$. Responsive to receiving the instruction, as shown in the second phase 402, the vehicles of the first and second set 404 and 406, respectively traverse the intersection 430 by moving move along trajectories corresponding to the movement options $p_5$ and $p_1$.

FIG. 4C depicts another example scenario in which movement options conflict. In particular, in a first phase 400', a first set of vehicles 408 is queued up at the intersection 430 and waiting to proceed through the intersection in a westerly direction along movement option $p_6$ and a second set of vehicles 406 is queued up at the intersection 430 facing the first set of vehicles 408 and waiting to make a left turn in a northerly direction along movement option $p_1$. The conflict identifier 220 has determined that these movement options $p_1$ and $p_6$ conflict, and as such is not grouped them into the compatible movement group. If the vehicles of the sets 406 and 408 had proceeded along trajectories consistent with the movement options, as reflected by a second example phase 402', there is a high probability of conflicts between various vehicles of the sets 406 and 408 would occur, which could lead to collisions, increased delay in traversing the intersection, need to make avoidance maneuvers, etc.

FIG. 4D depicts another example scenario involving three movement options, $p_1$, $p_{6''}$, and $p_{6'}$. In this scenario, the above-discussed movement option $p_6$ is split into two different movement options, where the traffic turning right in the traffic going straight correspond to different movement options $p_{6''}$ and $p_{6'''}$, respectively. Similar to the example in FIG. 4C, movement option $p_{6'}$ and $p_1$ conflict, while movement options $p_1$ and $p_{6''}$ do not conflict. As such, the conflict identifier 220 may group movement options $p_1$ and $p_{6''}$ into a compatible movement group, such that the traffic management engine 120 may release and stop the vehicles corresponding to those movement groups at the same time as part of the management of the traffic through the intersection 430, as discussed elsewhere herein. In particular, in the first phase 400'', a first set of vehicles 410' is queued up to head through the intersection 430 in a westerly direction according to movement option $p_{6'}$, second set of vehicles 406 is queued at the intersection 430 to make a left turn according to movement option $p_1$, and a third set of vehicles 410'' is queued up to make a right turn at the intersection 430 according to movement option $p_{6''}$. In the second phase 402'', the second and third sets of vehicles 406 and 410'' are instructed by the traffic management engine 122 proceed along the respective routes reflected by the movement options $p_1$ and $p_{6''}$ because they belong to the second compatible movement group and have been determined by the traffic management engine 120 satisfy the criteria for proceeding next through the intersection 430, as discussed elsewhere herein.

In some embodiments, a set of compatible movement groups for a given intersection may be static unless the structure of an intersection changes, and may be stored in the data store 124 in association with an intersection profile for the intersection once predefined or computed by the traffic management engine 120. The intersection profile may comprise a unique identifier for the intersection, geolocation data specifying a location of the intersection (e.g., a street address, geopositioning system coordinates, etc.).

In blocks 310a . . . 310n, the conflict identifier 220 may calculate a group delay value for each compatible movement group. A compatible movement group delay value may reflect, for a certain point in time, the amount of time needed for the connected and unconnected vehicles associated with the movement options of the compatible movement group to traverse the conflict zone of the intersection. A group delay value may be updated based on the dynamics of new vehicles that approach the intersection.

The compatible movement group identifier 220 may compute a group delay value for a given conflict group based on dynamic vehicle data being received over time from connected vehicles that are determined to perform the movements of the conflict group. In some embodiments, the vehicle monitor 222 may receive and monitor the dynamic vehicle data from vehicles in the control region of an intersection and the delay predictor may process the dynamic vehicle data to predict various dynamic parameters of the vehicles (e.g., speed of vehicle, rate of velocity change of vehicle, time of arrival of vehicle to the conflict zone, time needed for vehicle to traverse intersection from current position, etc.).

By way of illustration, in block 320, the vehicle monitor 222 monitors the connected vehicles associated with the intersection and determines dynamic vehicle parameters of the connected and unconnected vehicles 103 in the control region of the intersection. For instance, at any time step t, connected vehicles can share their dynamics with the traffic management engine 102, including their current distances to the intersection, current speeds, and times and speeds entering the control region, via vehicular micro-clouds, edge servers, etc., that are wirelessly accessible at the intersection.

In block 322, the delay predictor 224 predicts a vehicle delay 324 and a vehicle movement 326 for each vehicle for a given point in time (e.g., a future time interval $\Delta t$ (e.g., which may be predetermined, dynamically determined, etc.)) based on the determined dynamic vehicle parameters of the connected and unconnected vehicles 103 in the control region of the intersection.

The compatible movement group identifier 220 may receive the predicted vehicle delay and use it to calculate a group delay for CG 1 in block 310a and a group delay for CG N in block 310n (and for any intervening or later control groups, as applicable). More particularly, using the compatible movement groups from FIG. 4A as a further example, the conflict identifier 220 may compute a delay value for $g_1$ based on the vehicle parameters (e.g., vehicle delays 324) for the vehicles determined to be associated with movement options $p_5$ and $p_1$. These vehicles may include connected vehicles and unconnected vehicles.

In some embodiments, the conflict identifier 220 may retrieve conflict data for a given intersection, such as the set of compatible movement groups and the corresponding delay values, from the data store 124 using the unique identifier for the intersection, and provide the set of compatible movement groups to the compatible movement group selector 226 for processing. In some embodiments, the compatible movement selector 226 may retrieve the conflict data from the data store 124 or other non-transitory memory where it may be stored for access (e.g., by the conflict identifier 220).

Figure 5:
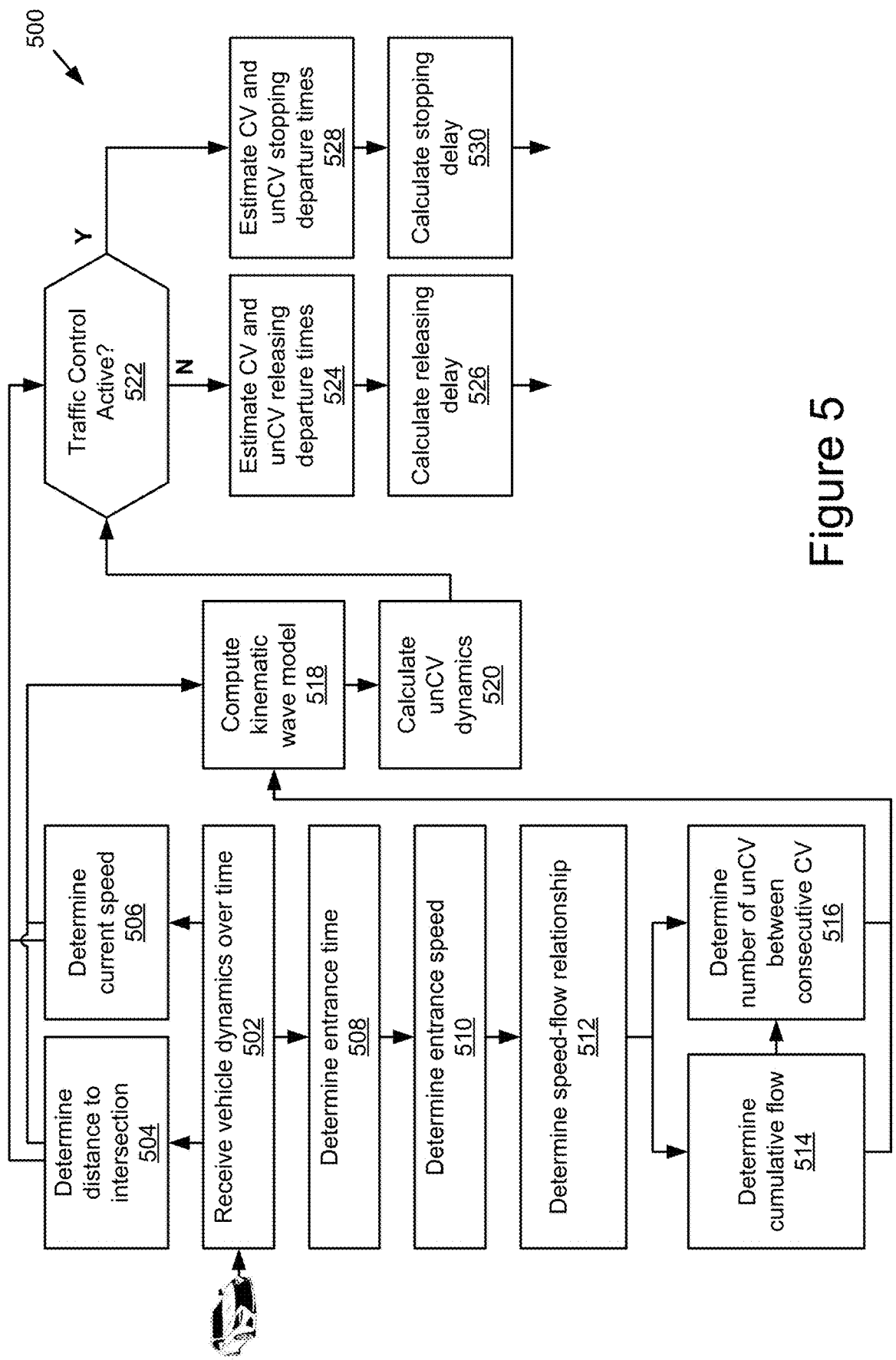
FIG. 5 is a flowchart of an example movement delay prediction method 500 for a given intersection.

FIG. 5 is a flowchart of an example movement delay prediction method 500 for a given intersection.

In block 502, the vehicle monitors 222 receives dynamic vehicle data reflecting the dynamics of the connected vehicles within the control region of the intersection. The dynamic vehicle data may specify the geolocation of the vehicle and other dynamic vehicle parameters, such as speed, rate of speed change (e.g., acceleration, deceleration, etc.), steering angle, braking value (e.g., reflecting the level of braking, if any), etc.

In block 508, the vehicle monitor 222 may determine an entrance time for each connected vehicle 103 based on the dynamic vehicle data of that vehicle 103 and the current position of the vehicle 103. The entrance time for a given connected vehicle 103 may reflect an estimate of when the connected vehicle 103 may enter the conflict zone of the intersection at a particular time. For example, knowing the current position of the vehicle 103, the heading of the vehicle 103, the speed of the vehicle 103, and the rate of change of the speed of the vehicle 103, etc., the traffic management engine 120 can compute the time at which the vehicle 103 could enter the conflict zone of the intersection. Further, as new sets of dynamic vehicle data are received, the entrance time estimate for a given vehicle may be updated by the traffic management engine 120.

In block 510, the vehicle monitor 222 may determine an entrance speed for each connected vehicle 103 based on the dynamic vehicle data of that vehicle 103 and the current position of the vehicle 103. As with the entrance time, the entrance speed for a given connected vehicle 103 may reflect an estimate of the speed at which the connected vehicle 103 may enter the conflict zone of the intersection at the time estimated in block 502. For example, knowing the current position of the vehicle 103, the heading of the vehicle 103, the speed of the vehicle 103, and the rate of change of the speed of the vehicle 103, etc., the traffic management engine 120 can compute the speed at which the vehicle 103 could enter the conflict zone of the intersection. Further, as new sets of dynamic vehicle data are received, the entrance speed estimate for a given vehicle may be updated by the traffic management engine 120.

In block 512, the vehicle monitor 222 may determine the speed-flow relationship for each movement option of the intersection. The speed-flow relationship may comprise a mapping between the number of vehicles associated with a particular movement, their speed, and their distance on the one hand, and on the other, the time it would take for those vehicles to perform the movement (movement delay). For example, a high density of vehicles traveling at a low speed results it a higher movement delay relative to a lower density of vehicles traveling and a higher speed. Each intersection supported by the system 100 may have a speed-flow relationship that is tailored to the characteristics of the intersection, such as the number of lanes, the geometry (e.g., size, shape, etc.), etc. In some cases, the traffic management engine 120 may associate the intersection with a particular speed-flow relationship responsive to processing graphical images (e.g., satellite imagery, vehicle-captured images, etc.). In further cases, an intersection may be tagged (e.g., by an administrator, etc.) with a speed-flow relationship. Other variations are also possible and contemplated.

In block 514, using the speed-flow relationship for each path, and the times and speeds determined in blocks 508 and 510, the vehicle monitor 222 may estimate a cumulative flow rate for each movement of an approach segment of the control region. The cumulative flow rate may reflect the flow of the connected vehicles for a movement or path from that approach segment.

In block 516, the vehicle monitor 222 may determine the number of unconnected vehicles between any two consecutive connected vehicles using the cumulative flow. In some embodiments, the vehicle monitor 222 may identify the positions of the connected vehicles within the cumulative flow, identify the spaces between the connected vehicles, and determine whether unconnected vehicles 103 may fit in the spaces.

The vehicle monitor 222 may additionally or alternatively utilize the sensor data from the connected vehicles 103 to determine and/or confirm whether an unconnected vehicle 103 may be situated in the spaces. For instance, the vehicle monitor 222 may process image data from forward, side, and/or rear-facing image sensors of the connected vehicles 103 to detect the presence or absence of an adjacent unconnected vehicle 103. In another example, the vehicle monitor 222 may process proximity sensor data from proximity sensors of the connected vehicles 103 to determine if intervening objects (e.g., assumed to be unconnected vehicles since they are moving) between the connected vehicles 103 are detected. Other variations are also possible and contemplated.

Additionally or alternatively to the foregoing, in block 504, the vehicle monitor 222 may compute the distance of the connected vehicles 103 to the conflict zone based on the current locations of the vehicles and the side(s) of the conflict zone being approached by the connected vehicles 103. In block 506, the vehicle monitor 222 may determine the current speeds of the connected vehicles 103 (which may be reflected in the dynamic vehicle data of those connected vehicles 103).

In block 518, the vehicle monitor 222 may input, the entrance speeds, and entrance times, and/or other dynamics and/or parameters of the connected vehicles which have unconnected vehicles between them into a kinematic wave model that utilizes the cumulative flow determinations from block 516.

In block 520, the vehicle monitor 222 may use the kinematic wave model to predict the dynamics of the unconnected vehicles. The predicted dynamics of the unconnected vehicles may include their times entering the control region, current speeds, distances to conflict zone, estimated times to enter the conflict zone, etc.

The kinematic wave mode may comprise a single or system of equations that are based on the physical principle of conservation. As the number of vehicles entering and exiting an intersection, or in some cases, entering and exiting a movement option, essentially remain the same, the quantity is considered conserved, which allows the model to predict the densities, velocities, patterns, etc., at future time. By way of further example, the kinematic wave model may be based on the following equation, which relates traffic density and vehicle velocity, $$\rho_t(x,t)+(\rho(x,t)v(x,t))_x=0,$$

where $\rho$ is density, v is velocity, x is a position/point, and t is time. Under this equation, if the initial density and the velocity field are known, a future traffic density can be predicted. A velocity function for the traffic flow model that is dependent on density may be selected. Further information about such models may be found Kachroo, P., Al-nasur, S., Amin Wadoo, S. and Shende, A. (2008). *Pedestrian Dynamics*. Berlin, Heidelberg: Springer-Verlag Berlin Heidelberg, which is incorporated herein by reference in its entirety.

In block 522, the traffic management engine 120 may determine if traffic control is active. Being inactive means that no connected vehicles are receiving control instructions for that intersection (and that traffic is approaching the intersection (e.g., at or near the speed limit). Being active means the traffic management engine 120 is currently instructing connected vehicles in the control region that are moving along a trajectory defined by one or more active movement options (e.g., of an active compatible movement group) to continue their movement, and is currently instructing the connected vehicles in the control region that are unassociated with the active movement option(s) to queue up at the conflict zone threshold according to the inactive movement options that they are associated with. By way of further example, the movement options $p_5$ and $p_1$ may be active, meaning the vehicles associated with that movement option are receiving instructions to proceed through the intersection according to those options, while the other movement options $p_5$ and $p_2$, $p_3$, $p_4$, $p_6$, $p_7$, $p_8$, $p_9$, $p_{10}$, etc. are inactive and the traffic associated with those options are instructed to stop.

If the determination in block 522 is negative, the delay predictor 224 may estimate, for each movement option, releasing departure times for the vehicles approaching, at, or in the conflict zone. A releasing departure time is the time that it takes for a vehicle that is moving according to a given movement option, to proceed through and exit the conflict zone of intersection if no speed control is applied (a virtual green light is assigned to the movement). The predicted releasing departure time of each vehicle (whether connected or unconnected) may be derived from the kinematic wave model using the distance of each vehicle from a threshold of the conflict zone, as determined in block 504, and their current speed.

By way of further example, consider $\Delta t$ as the time interval used to estimate and release optimal compatible movement group. At every $\Delta t$, the conflict identifier 220 may search for the optimal compatible movement group to minimize a total vehicle delay at the intersection. According to the group selected, the vehicle dynamics controller 228 may provide action control instructions to all connected vehicles in the control region simultaneously.

For example, for a vehicle k, assume that the number of vehicles ahead is k−1. At the beginning of the time step n, $t_n$, the delay predictor 224 can predict the releasing and stopping departure times.

For the releasing departure time, assume that a virtual green light is applied during $(t_n, t_n+\Delta t]$. Hence, the anticipated releasing departure time is set as $$\tau_k^r = \min\left\{t_n + \frac{x_k}{v_f}, t_n + \left(\frac{1}{v_q} + \frac{1}{v_f}\right)(k-1)L_c\right\}.$$

Here, $v_f$ is the road speed limit, $v_q$ is the queue releasing speed from head to tail when a green light is assigned, $x_k$ is the distance to the intersection of the vehicle k, and $L_c$ is the average length of vehicles. The first part in the equation is the departure time if the vehicle is travel with the road speed limit and there are not any other vehicles stopping ahead to delay it. The second part is the departure time that the vehicle is delayed by the vehicles ahead, which is derived from the kinematic wave model.

In another example, a vehicle that is the third vehicle back in a lane entering a conflict zone of an intersection may have a higher releasing departure time than a vehicle in front of it. Since the dynamics (e.g., current speed, position, etc.) of both the unconnected vehicles and the connected vehicles in the queue have been computed and are available, releasing departure times for both the unconnected vehicles and the connected vehicles may be estimated in block 524 (e.g., using the kinematic wave model or another suitable traffic flow model).

In some embodiments, the leading vehicles, which are the vehicles in the front of each line, may be connected vehicles and can be passively or actively controlled to regulate the speed of the vehicles behind them, thereby consistently controlling the release speed and flow of the queue of vehicles through the conflict zone of the intersection. For example, the connected vehicles 103 may be instructed to travel at a certain speed in the approach segments and/or through and/or out of the conflict zone (e.g., have a certain a rate of accelerate up to the posted speed limit, maintain a certain speed, etc.).

In block 526, the delay predictor 224 may predict, for each movement option, a releasing delay, which is the summation of the difference between the anticipated travel time of each vehicle of that movement option and the free-flow travel time. The free-flow travel time reflects the amount of time needed to perform the movement if a vehicle was able to travel freely through the intersection (e.g., at the posted speed limit and uninhibited by other traffic). The anticipated stopping time is the difference between its anticipated releasing departure time and the time entering the control region.

If the determination in block 522 is affirmative, the delay predictor 224 may estimate, in block 528, the stopping departure times for the vehicles in the control region of the intersection. When controlling traffic, the traffic management engine 120 cycles through the compatible movement groups to regulate the traffic through the intersection. As the queues of vehicles of the movement options that are stopped at the intersection accumulate more vehicles, the delays corresponding to those movement options also grow.

A stopping departure time is the time that it takes for a vehicle that is moving according to a given movement option, to proceed through and exit the conflict zone of intersection if speed control is applied (a virtual red light is assigned to the movement). The delay predictor 224 can predict stopping departure times of the connected and unconnected vehicles 103 based on the distances and the stopping departure times of the leading vehicles 103.

For instance, continuing the above example, for the stopping departure time, consider that a virtual red light is applied during $(t_n, t_n+\Delta t]$, and the earliest green light can be applied to the movement is $t_n+\Delta t$. In this case, the stopping departure time is $$\tau_k^s = \min\left\{t_n + \frac{x_k}{v_f}, t_n + \Delta t + \left(\frac{1}{v_q} + \frac{1}{v_f}\right)(k-1)L_c\right\}.$$

Here, the first part in the equation is still the departure time if the vehicle is traveling at the road speed limit and there are not any other vehicles stopping ahead to delay it.

The second part is the departure time that the vehicle where the vehicle is delayed by the vehicles ahead based on the assumption that the first vehicle(s) for the movement type are released at time $t_n+\Delta t$.

In block 530, the delay predictor 224 may predict, for each movement option, a stopping delay, which is the summation of the difference between the anticipated travel time of each vehicle of that movement option and the free-flow travel time. The free-flow travel time reflects the amount of time needed to perform the movement if a vehicle was able to travel freely through the intersection (e.g., at the posted speed limit and uninhibited by other traffic). The anticipated stopping time is the difference between its anticipated stopping departure time and the time entering the control region.

The following example is provided to further illustrate the stopping and releasing delay of each compatible movement group. First at time $t_n$, the releasing and stopping delays of all vehicles in each compatible movement group are computed and shown in the following tables 1 and 2. Here, the releasing delay of each group is the summation of the releasing delay of all vehicles in the group, and the stopping delay of each group is the summation of the stopping delay of all vehicles in the group.

TABLE 1

| Compatible Movement Group | Releasing Delay |
| --- | --- |
| CG1 | $D_1^r$ |
| CG2 | $D_2^r$ |
| CG3 | $D_3^r$ |
| CG4 | $D_4^r$ |
| CG5 | $D_5^r$ |

TABLE 2

| Compatible Movement Group | Stopping Delay |
| --- | --- |
| CG1 | $D_1^s$ |
| CG2 | $D_2^s$ |
| CG3 | $D_3^s$ |
| CG4 | $D_4^s$ |
| CG5 | $D_5^s$ |

The delay predictor 228 may then predict the total vehicle delay of the intersection by evaluating the release of each compatible movement group.

| Releasing Compatible Movement Group | Predicted total delay |
| --- | --- |
| CG1 | $D_1^r + D_2^s + D_3^s + D_4^s + D_5^s$ |
| CG2 | $D_1^s + D_2^r + D_3^s + D_4^s + D_5^s$ |
| CG3 | $D_1^s + D_1^s + D_3^r + D_4^s + D_5^s$ |
| CG4 | $D_1^s + D_2^s + D_3^s + D_4^r + D_5^s$ |
| CG5 | $D_1^s + D_2^s + D_3^s + D_4^s + D_5^r$ |

The delay predictor 228 may determine that CG1 is the optimal group with the minimum predicted total delay, in which case the vehicle dynamics controller 228 may release the vehicles in the CG1 and hold all vehicles in the other groups.

In this example, for all connected vehicles in CG1, their advisory speed limit is set as the road speed limit, $v_f$, to reproduce the virtual green light effect. For all connected vehicles in the other groups, their advisory speed limit is set as $$v_k^c = \frac{x_k}{(\tau_k^s - t_n)}$$

to reproduce the effect of the virtual red light.

Referring again to FIG. 3, in block 312, the compatible movement group selector 226, using the stopping and releasing delay values computed by the conflict identifier 200 for each compatible movement group CG 1 . . . CG N, may select a particular compatible movement group, which the vehicle dynamics controller 228 may be used to control the vehicle dynamics of one or more of the vehicles 103 at the intersection.

In some embodiments, the compatible movement group selector 226 may be configured to search for and select the optimal compatible movement group to minimize the predicted total vehicle delay of the intersection in the next time interval. For example, the compatible movement group selector 226 may first estimate the total intersection delay as the sum of the releasing delays all movements in one compatible movement group g, g=1, 2, . . . , G, and the stopping delays of all movements in all other compatible movement groups. The compatible movement group g* with the minimum intersection delay may be chosen as the optimal group.

In block 328, the vehicle dynamics controller 228 may, with the identified optimal group selected by the compatible movement group selector 226, calculate advisory speed limits for the connected vehicles in the intersection. For example, for any connected vehicle k in all movements of the selected compatible movement group, its advisory speed limit may be set as a speed limit $v_f$, i.e., $v_k^c(t)=v_f$. For any connected vehicle j in the movements of the other groups, its speed limit may be set as $$v_j^c(t) = \min\left(\frac{x_j}{\tau_j^s - t_n}, v_f\right).$$

In block 328, the vehicle dynamics controller 228 provides instructions to control one or more dynamics of the vehicle. In some embodiments, the vehicle dynamics controller determines and applies advisory speed limits are applied for the connected vehicles 103 in a next time interval. In response, it is desirable for the drivers or the autonomous vehicle controllers maintain their speeds equal to lower than the advisory speed limits to optimize the performance of the intersections, although it is not required that the advisory speed thresholds be followed exactly for the remote control provided by the traffic management engine 102 to be effective. Advantageously, the speed control instructed by the vehicle dynamics controller 228 can reduces the difficulty of controlling the vehicles in the intersection, and is applicable and accessible to both human guided and autonomously guided vehicles.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of ay hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   determining a first set of vehicles associated with a first movement option at an intersection;
   determining a second set of vehicles associated with a second movement option at the intersection that conflicts with the first movement option;
   calculating a first delay for the first movement option;
   calculating a second delay for the second movement option; and
   transmitting, via a communication network to one or more connected vehicles of the first set of vehicles and one or more connected vehicles of the second set of vehicles, control instructions for traversing the intersection based on the first delay and the second delay.

2. The method of claim 1, further comprising:
   estimating, using a traffic flow model, a releasing departure time and a stopping departure time for each vehicle in the first set of vehicles based on vehicle data of the one or more connected vehicles and vehicle data of one or more unconnected vehicles in the first set of vehicles.

3. The method of claim 2, further comprising:
   receiving, from the one or more connected vehicles in the first set of vehicles, the vehicle data of the one or more connected vehicles;
   determining, based on the vehicle data of the one or more connected vehicles, the one or more unconnected vehicles in the first set of vehicles; and
   predicting the vehicle data of the one or more unconnected vehicles based on the vehicle data of the one or more connected vehicles in the first set of vehicles.

4. The method of claim 1, further comprising:
   calculating a first threshold speed for the one or more connected vehicles in the first set of vehicles and a second threshold speed for the one or more connected vehicles in the second set of vehicles; and
   generating the control instructions for the one or more connected vehicles in the first set of vehicles and the one or more connected vehicles in the second set of vehicles based on the first threshold speed and the second threshold speed.

5. The method of claim 1, further comprising:
   determining to release the first set of vehicles and stop the second set of vehicles;
   calculating a first threshold speed for a first connected vehicle in the first set of vehicles based on a speed limit associated with the intersection; and
   calculating a second threshold speed for a second connected vehicle in the second set of vehicles based on a stopping departure time of the second connected vehicle and a distance between the second connected vehicle and the intersection.

6. The method of claim 1, wherein calculating the first delay for the first movement option includes:
   calculating a releasing delay for the first movement option, the releasing delay corresponding to speed control not being applied to the first movement option in a time interval; and
   calculating a stopping delay for the first movement option, the stopping delay corresponding to the speed control being applied to the first movement option in the time interval.

7. The method of claim 1, wherein calculating the first delay for the first movement option includes:
   estimating, for each vehicle in the first set of vehicles, a releasing departure time corresponding to speed control not being applied to the first movement option;
   calculating a vehicle delay for each vehicle in the first set of vehicles based on the releasing departure time; and
   calculating a releasing delay for the first movement option based on the vehicle delay of each vehicle in the first set of vehicles.

8. The method of claim 1, wherein calculating the first delay for the first movement option includes:
   estimating, for each vehicle in the first set of vehicles, a stopping departure time corresponding to speed control being applied to the first movement option;
   calculating a vehicle delay for each vehicle in the first set of vehicles based on the stopping departure time; and
   calculating a stopping delay for the first movement option based on the vehicle delay of each vehicle in the first set of vehicles.

9. The method of claim 1, further comprising:
   calculating, using the first delay of the first movement option and the second delay of the second movement option, a first total delay corresponding to a release of the first set of vehicles in the first movement option;
   calculating, using the first delay of the first movement option and the second delay of the second movement option, a second total delay corresponding to a release of the second set of vehicles in the second movement option; and
   determining to release one of the first set of vehicles associated with the first movement option and the second set of vehicles associated with the second movement option based on the first total delay and the second total delay.

10. The method of claim 9, wherein:
    calculating the first total delay corresponding to the release of the first set of vehicles in the first movement option is based on a releasing delay of the first movement option and a stopping delay of the second movement option; and
    calculating the second total delay corresponding to the release of the second set of vehicles in the second movement option is based on a releasing delay of the second movement option and a stopping delay of the first movement option.

11. A system comprising:
    one or more processors; and
    one or more non-transitory computer-readable memories storing instructions that, when executed by the one or more processors, cause the system to:
    determine a first set of vehicles associated with a first movement option at an intersection;
    determine a second set of vehicles associated with a second movement option at the intersection that conflicts with the first movement option;
    calculate a first delay for the first movement option;
    calculate a second delay for the second movement option; and
    transmit, via a communication network to one or more connected vehicles of the first set of vehicles and one or more connected vehicles of the second set of vehicles, control instructions for traversing the intersection based on the first delay and the second delay.

12. The system of claim 11, wherein the instructions, when executed by the one or more processors, further cause the system to:
    estimate, using a traffic flow model, a releasing departure time and a stopping departure time for each vehicle in the first set of vehicles based on vehicle data of the one or more connected vehicles and vehicle data of one or more unconnected vehicles in the first set of vehicles.

13. The system of claim 12, wherein the instructions, when executed by the one or more processors, further cause the system to:
receive, from the one or more connected vehicles in the first set of vehicles, the vehicle data of the one or more connected vehicles;
determine, based on the vehicle data of the one or more connected vehicles, the one or more unconnected vehicles in the first set of vehicles; and
predict the vehicle data of the one or more unconnected vehicles based on the vehicle data of the one or more connected vehicles in the first set of vehicles.

14. The system of claim 11, wherein the instructions, when executed by the one or more processors, further cause the system to:
calculate a first threshold speed for the one or more connected vehicles in the first set of vehicles and a second threshold speed for the one or more connected vehicles in the second set of vehicles; and
generate the control instructions for the one or more connected vehicles in the first set of vehicles and the one or more connected vehicles in the second set of vehicles based on the first threshold speed and the second threshold speed.

15. The system of claim 11, wherein the instructions, when executed by the one or more processors, further cause the system to:
determine to release the first set of vehicles and stop the second set of vehicles;
calculate a first threshold speed for a first connected vehicle in the first set of vehicles based on a speed limit associated with the intersection; and
calculate a second threshold speed for a second connected vehicle in the second set of vehicles based on a stopping departure time of the second connected vehicle and a distance between the second connected vehicle and the intersection.

16. The system of claim 11, wherein calculating the first delay for the first movement option includes:
calculating a releasing delay for the first movement option, the releasing delay corresponding to speed control not being applied to the first movement option in a time interval; and
calculating a stopping delay for the first movement option, the stopping delay corresponding to the speed control being applied to the first movement option in the time interval.

17. The system of claim 11, wherein calculating the first delay for the first movement option includes:
estimating, for each vehicle in the first set of vehicles, a releasing departure time corresponding to speed control not being applied to the first movement option;
calculating a vehicle delay for each vehicle in the first set of vehicles based on the releasing departure time; and
calculating a releasing delay for the first movement option based on the vehicle delay of each vehicle in the first set of vehicles.

18. The system of claim 11, wherein calculating the first delay for the first movement option includes:
estimating, for each vehicle in the first set of vehicles, a stopping departure time corresponding to speed control being applied to the first movement option;
calculating a vehicle delay for each vehicle in the first set of vehicles based on the stopping departure time; and
calculating a stopping delay for the first movement option based on the vehicle delay of each vehicle in the first set of vehicles.

19. The system of claim 11, wherein the instructions, when executed by the one or more processors, further cause the system to:
calculate, using the first delay of the first movement option and the second delay of the second movement option, a first total delay corresponding to a release of the first set of vehicles in the first movement option;
calculate, using the first delay of the first movement option and the second delay of the second movement option, a second total delay corresponding to a release of the second set of vehicles in the second movement option; and
determine to release one of the first set of vehicles associated with the first movement option and the second set of vehicles associated with the second movement option based on the first total delay and the second total delay.

20. A system comprising:
means for determining a first set of vehicles associated with a first movement option at an intersection;
means for determining a second set of vehicles associated with a second movement option at the intersection that conflicts with the first movement option;
means for calculating a first delay for the first movement option;
means for calculating a second delay for the second movement option; and
means for transmitting, via a communication network to one or more connected vehicles of the first set of vehicles and one or more connected vehicles of the second set of vehicles, control instructions for traversing the intersection based on the first delay and the second delay.

* * * * *